Patented Jan. 21, 1941

2,229,407

UNITED STATES PATENT OFFICE 2,229,407

LIQUID DIELECTRIC COMPOSITION

Robert R. Dreisbach, Midland, Mich., assignor to The Dow Chemical Company, Midland, Mich., a corporation of Michigan No Drawing. Application November 12, 1938, Serial No. 240,049

6 Claims. (Cl. 252—66)

This invention concerns certain new liquid dielectric compositions which are substantially non-flammable, do not evolve flammable vapors when subjected to decomposition in an electric arc, and which are less toxic than previously known non-flammable liquid dielectric compositions.

It is known that nuclear chlorinated aromatic hydrocarbons and their mixtures, wherein the number of chlorine atoms in the compound or composition equals or exceeds the number of hydrogen atoms, frequently are non-flammable, possess good dielectric properties and have low congealing and high boiling temperatures which render them suitable electric insulating agents for most purposes. Diphenyl chlorinated to such extent that it contains an average of 5 or more chlorine atoms per molecule, diphenyl-oxide chlorinated to like extent, and mixtures of these highly chlorinated compounds with trichloro benzene are examples of well known dielectric compositions of the type just mentioned.

However, it also is known that such highly chlorinated aromatic hydrocarbons usually are quite toxic, producing dermatitis on prolonged contact with the skin and sometimes causing liver and kidney disorders in workmen who repeatedly are exposed to the compounds in liquid or vapor form. Accordingly, there is some hazard involved in handling most known liquid dielectric compositions of the type just discussed.

In my co-pending application, Serial No. 216,298, filed June 28, 1938, of which the present application is a continuation-in-part, it is disclosed that nuclear chlorinated diethyl benzene mixtures, having an average of from 3 to 4 chlorine atoms per molecule, are far less toxic than the more highly chlorinated aromatic compounds, e. g. pentachloro diphenyl, previously used in dielectric compositions and, further, that such chlorinated diethyl benzene mixtures have physical and dielectric properties which render them well adapted for general use as liquid insulating agents. It is also pointed out that the chlorinated diethyl benzene mixtures are nearly non-flammable, example being given of one such mixture which flashed but would not sustain a flame when heated to 154° C.

It has since been found that the nuclear chlorinated diethyl benzene mixtures of the co-pending application, Serial No. 216,298, although possessing high flash points and not tending to burn when an electric arc is quenched therein, nevertheless may in some instances be made to give off vapors that will sustain a flame by heating at temperatures above their flash points.

An object of this invention is to provide certain new liquid dielectric compositions having desirable qualities similar to those of the chlorinated diethyl benzene mixtures described in said co-pending application, but which, in addition are self-quenching when heated to a flashing temperature and will not burn continuously regardless of the temperature to which they are heated. More specifically, it is an object of this invention to provide liquid dielectric compositions which are less toxic than polychlorinated aromatic hydrocarbons such as pentachloro diphenyl heretofore known as non-flammable liquid dielectrics and which in addition have good dielectric properties and low congealing and high boiling temperatures rendering them well adapted to general use as liquid dielectric agents.

The liquid dielectric agents provided by this invention consist essentially of complex mixtures of nuclear chlorinated and nuclear brominated alkyl benzenes. They contain a greater number of hydrogen atoms than halogen atoms and they contain at least 0.03 bromine atom per chlorine atom. It may be mentioned that the bromine content of the mixture provides a quenching action which prevents continuous burning and permits employment of a lower ratio of halogen to hydrogen than has heretofore been thought possible in non-flammable liquid dielectrics composed of halogenated aromatic compounds. In order to obtain rapid quenching, the composition should contain a nuclear brominated aromatic compound which boils at a temperature not more than 10° C. higher, and preferably at about the same temperature or somewhat below, as the boiling point of the major ingredient of the composition containing more hydrogen atoms than halogen atoms in its molecule. Other brominated aromatic hydrocarbons of higher boiling point may also be present, if desired. The ratio of hydrogen atoms to halogen atoms in the dielectric compositions is usually between 1.2 and 1.5, preferably between 1.4 and 1.5, and the ratio of bromine atoms to chlorine atoms is usually between 0.04 and 0.06, but atomic ratios higher than those just stated may sometimes be used. The halogenated alkyl benzenes in the mixture contain an average of from 3.5 to 4.5 halogen atoms per molecule.

As just stated the new dielectric compositions consist essentially of mixtures of nuclear halogenated alkyl benzenes and these are the only compounds which need be present. However, it sometimes is desirable to add a small proportion, i. e. not more than 20 per cent by weight, of another halogenated aromatic compound such as hexachloro diphenyloxide, tribromo diphenyloxide, trichloro tribromo diphenyl, pentachloro diphenyl, pentachloro naphthalene, etc., for purpose of obtaining a ratio of hydrogen atoms to halogen atoms in the mixture within the preferred limits of 1.4 to 1.5 given above. It also is usually desirable to add a minor proportion (not more than 20 per cent by weight) of trichloro benzene for purpose of reducing the viscosity and lowering the congealing temperatures of the compositions. The new dielectrics containing such added ingredients in the small proportions just mentioned are not nearly as toxic as are said ingredients alone.

The identity of the nuclear halogenated alkyl benzenes in the dielectric compositions is of secondary importance, provided the compositions as a whole, meet the foregoing general description. They may be nuclear chlorinated and brominated derivatives of toluene, xylene, mesitylene, ethyl benzene, diethyl benzene, isopropyl benzene, secondary butyl benzene, or mixtures thereof, etc., and they may contain the chlorine and bromine substituents in the same or in different molecules. However, the mixture obtained by ethylating benzene until it contains an average of from 1 to 2 ethyl groups per molecule and then successively chlorinating and brominating the ethylated benzene possesses an especially good combination of physical and electrical properties and is preferred.

The following examples illustrate certain ways in which the principle of the invention has been applied, but are not to be construed as limiting the invention.

*Example 1*

A mixture of isomeric diethyl tetrachloro benzenes was prepared by reacting ethylene with benzene in the presence of aluminum chloride until approximately 2 moles of ethylene was reacted per mole of benzene, distilling the product to separate the mixture of isomeric diethyl benzenes formed by the reaction, and thereafter reacting chlorine with the diethyl benzenes at temperatures between 40° and 60° C. in the presence of finely divided iron until nearly 4 moles of chlorine was reacted per mole of diethyl benzene. The mixture was then washed with water to remove dissolved hydrogen chloride therefrom, after which it was treated with about 5 per cent of its weight of sodium hydroxide and heated at temperatures between 250° and 280° C. for about 30 minutes. It was next cooled, again washed with water, and distilled under vacuum. Ethyl pentachloro benzene was prepared by chlorinating ethyl benzene in its nucleus and a mixture of isomeric monoethyl dichloro dibromo benzenes was prepared by successively ethylating, chlorinating and brominating benzene, the procedure being similar to that described above for the preparation of the diethyl tetrachloro benzene mixture. The products just mentioned were mixed with one another and trichloro benzene was added in such proportions as to form a solution consisting of approximately 45 per cent by weight diethyl tetrachloro benzene, 30 per cent ethyl pentachloro benzene, 15 per cent trichloro benzene and 10 per cent ethyl dichloro dibromo benzene. This solution could be made to flash, but would not burn continuously, i. e. it would not sustain a flame, regardless of the temperature to which it was heated. The gases evolved during decomposition of the solution in an electric arc were completely non-flammable. The solution distilled over the temperature range 220°–283° C., and was a clear liquid having a pour point of approximately −42.5° C., a viscosity of 47.1 Saybolt seconds at 40° C. and the specific gravity 1.502 at 25° C. with respect to water at the same temperature. It contained 54.6 per cent by weight of chlorine and 4.9 per cent of bromine. It had an electric resistivity at 1000 cycles of 4.42 ($10^{12}$) ohms, an electric power factor of 0.0543 per cent, and a dielectric constant of 4.12. Accordingly, it is an exceptionally effective liquid insulating agent. For purpose of testing its behavior toward metals, the composition was heated with aluminum foil at a temperature of 218° C. for 6 hours. No corrosion of the aluminum was observed.

*Example 2*

A liquid dielectric agent consisting of approximately 38 per cent by weight diethyl tetrachloro benzene, 24 per cent ethyl pentachlorobenzene, 19 per cent trichloro benzene, 14 per cent monoethyl dichloro dibromo benzene and 5 per cent of pentachloro diphenyloxide was prepared by dissolving said ingredients in one another. The diethyl tetrachloro benzene, ethyl pentachloro benzene, and the ethyl dichloro dibromo benzene present as ingredients of the agent were prepared as in Example 1. The pentachloro diphenyloxide ingredient was prepared by reacting chlorine with diphenyloxide in known manner and distilling the product. The dielectric agent had chlorine and bromine contents of 51.35 and 7.2 per cent by weight, respectively, and had an average of 1.43 hydrogen atoms per atom of halogen. It distilled at temperatures between 231° and 356° C. and congealed, i. e. became too viscous to flow readily, at a temperature of approximately −51° C. It had a viscosity of 41.3 Saybolt seconds at 40° C. and its specific gravity was 1.5140 at 25° C. It had a flash point of 177° C., but would not sustain a flame when heated in contact with air regardless of the temperature to which it was heated. The gases evolved by decomposing the agent in an electric arc were non-flammable. The electrical properties of the agent were:—

Resistivity at 1000 cycles____($10^{13}$) ohms__ 2.58
Power factor_____per cent__ 0.051
Dielectric constant_____ 4.12

The composition was heated with aluminum foil, as in Example 1, and was found to be non-corrosive toward the metal.

*Example 3*

As hereinbefore pointed out, the new dielectric agents provided by this invention contain as their major ingredient a mixture of nuclear halogenated alkyl benzenes containing an average of from 3.5 to 4.5 halogen atoms per molecule. The purpose of this example is to demonstrate that such nuclear halogenated alkyl benzenes are less toxic than are the compounds pentachloro diphenyl and pentachloro diphenyloxide heretofore recommended as non-flammable liquid dielectric agents. Each of the compounds ethyl trichloro benzene, ethyl tetrachloro benzene, diethyl dichloro benzene, diethyl trichloro benzene, diethyl tetrachloro benzene, pentachloro diphenyl and pentachloro diphenyloxide was tested both by contact with the skin of rabbits and by oral administration to rabbits for purpose of determining their relative toxicities. The chlorinated ethyl- and diethyl-benzenes all had about the same degree of toxicity regardless of the mode of testing and the pentachloro diphenyl and pentachloro diphenyloxide had approximately the same toxicity, but the chlorinated ethyl benzenes were in all instances far less toxic than were the pentachloro diphenyl or the pentachloro diphenyloxide. A single application of pentachloro diphenyl or pentachloro diphenyloxide behind the ear of a rabbit produced severe blistering and edema followed by a marked epithelial hyperphasia, which required nearly six weeks to subside and which left the skin severely pitted. When administered orally once daily for 20 days in doses corresponding to 0.1 gram of the chlorinated diphenyl or chlorinated diphenyloxide per kilogram body-weight of a rabbit, it was found, on autopsy after completion of the feedings, that severe pathological changes had occurred in the liver and kidney of the animal. Corresponding tests of the nuclear chlorinated ethyl benzenes showed them to be mildly toxic. Approximately 10 to 20 daily external administrations of any one of the chlorinated ethyl benzenes were required to obtain a toxic effect as severe as that produced by a single administration of the chlorinated diphenyl or chlorinated diphenyloxide. When the chlorinated ethyl benzenes were administered once daily for 20 days in dosage of 0.1 gram of such compound per kilogram body-weight of a rabbit, it was found on subsequent autopsy that the livers and kidneys of the rabbits had undergone very slight physiological changes which were not sufficient to interfere with the normal functioning of the organs.

The invention, in brief, provides new liquid dielectric agents which are substantially non-flammable, which contain an average of more than one hydrogen atom per halogen substituent, which are less toxic than are chlorinated aromatic hydrocarbons heretofore used as non-flammable liquid dielectrics, and which possess a combination of desirable electrical and physical properties that render them suitable as liquid insulating agents for general use, e. g. in transformers, capacitors, switch boxes, or for the impregnation of paper to be used as wrappings for wires and cables, etc.

Other modes of applying the principle of the invention may be employed instead of those explained, change being made as regards the compositions herein disclosed, provided the ingredient or ingredients stated by any of the following claims or the equivalent of such stated ingredient or ingredients be employed.

I therefore particularly point out and distinctly claim as my invention:

1. A substantially non-flammable liquid dielectric composition comprising diethyl tetrachloro benzene as its major ingredient, and ethyl pentachloro benzene, trichloro benzene, ethyl dichloro dibromo benzene and a compound selected from the class consisting of polychlorinated diphenyl and polychlorinated diphenyloxide as minor ingredients, which composition contains an average of at least 1.4 hydrogen atoms per atom of halogen.

2. A substantially non-flammable liquid dielectric composition containing about 38 per cent by weight of diethyl tetrachloro benzene, about 24 per cent of ethyl pentachloro benzene, about 19 per cent of trichloro benzene, about 14 per cent of ethyl dichloro dibromo benzene and about 5 per cent of pentachloro diphenyloxide.

3. A substantially non-flammable liquid dielectric composition consisting essentially of a mixture of nuclear halogenated alkyl benzenes containing an average of at least 1.2 hydrogen atoms per atom of halogen, in which mixture the halogen is largely chlorine but partly bromine, the atomic ratio of bromine to chlorine being at least 0.04.

4. A substantially non-flammable liquid dielectric composition consisting essentially of a mixture of nuclear halogenated alkyl benzenes containing an average of between 1.4 and 1.5 hydrogen atoms per atom of halogen, in which mixture the halogen is largely chlorine but partly bromine, the atomic ratio of bromine to chlorine being between 0.04 and 0.06.

5. A substantially non-flammable liquid dielectric composition comprising diethyl tetrachlorobenzene as its major ingredient and a nuclear halogenated aromatic hydrocarbon wherein at least part of the halogen is bromine as a minor ingredient, which composition contains an average of between 1.4 and 1.5 hydrogen atoms per atom of halogen and at least 0.04 bromine atom per atom of chlorine.

6. A substantially non-flammable liquid dielectric composition consisting essentially of a mixture of nuclear halogenated alkyl benzenes containing an average of at least 1.2 hydrogen atoms per atom of halogen, in which composition the halogen is largely chlorine but partly bromine, the atomic ratio of bromine to chlorine being at least 0.03.

ROBERT R. DREISBACH.